United States Patent
Olsen

(10) Patent No.: US 8,671,360 B2
(45) Date of Patent: Mar. 11, 2014

(54) DISTRIBUTING MULTIPLE CLIENT WINDOWS USING A DISPLAY SERVER

(75) Inventor: Dan R. Olsen, Provo, UT (US)

(73) Assignee: Brigham Young University, Provo, UT (US)

( * ) Notice: Subject to any disclaimer, the term of this patent is extended or adjusted under 35 U.S.C. 154(b) by 405 days.

(21) Appl. No.: 12/817,000

(22) Filed: Jun. 16, 2010

(65) Prior Publication Data

US 2010/0325576 A1  Dec. 23, 2010

Related U.S. Application Data

(60) Provisional application No. 61/268,991, filed on Jun. 17, 2009.

(51) Int. Cl.
*G06F 3/048* (2013.01)

(52) U.S. Cl.
USPC ........... 715/790; 715/751; 715/234; 715/781; 715/753; 709/205; 709/227; 709/219

(58) Field of Classification Search
None
See application file for complete search history.

(56) References Cited

U.S. PATENT DOCUMENTS

| | | | |
|---|---|---|---|
| 5,341,477 A | | 8/1994 | Pitkin et al. |
| 5,689,717 A | * | 11/1997 | Pritt ............................... 715/234 |
| 5,758,110 A | * | 5/1998 | Boss et al. ..................... 715/751 |
| 5,856,826 A | | 1/1999 | Craycroft |
| 7,028,266 B2 | * | 4/2006 | Ben-Shachar et al. ........ 715/790 |
| 7,260,784 B2 | * | 8/2007 | Crichton ........................ 715/751 |
| 8,046,712 B2 | | 10/2011 | Landman et al. |
| 8,407,605 B2 | * | 3/2013 | Go et al. ........................ 715/753 |
| 2002/0165922 A1 | * | 11/2002 | Wei ................................ 709/205 |
| 2005/0091608 A1 | | 4/2005 | Gusmorino et al. |
| 2006/0036958 A1 | | 2/2006 | Dreher |
| 2006/0109256 A1 | | 5/2006 | Grant et al. |
| 2006/0168141 A1 | * | 7/2006 | Yoshikai et al. ............... 709/219 |
| 2006/0230156 A1 | * | 10/2006 | Shappir et al. ................. 709/227 |
| 2008/0034317 A1 | * | 2/2008 | Fard et al. ...................... 715/781 |
| 2008/0148167 A1 | | 6/2008 | Russak et al. |

OTHER PUBLICATIONS

Anderson, R. et al., "Experiences With A Tablet PC Based Lecture Presentation System in Computer Science Courses," In Proceedings of the 35th SIGCSE Technical Symposium on Computer Science Education, Norfolk VA, USA, Mar. 3-7, 2004, SIGCSE '04. ACM, NY, NY, pp. 56-60.

(Continued)

*Primary Examiner* — Boris Pesin
*Assistant Examiner* — Ayesha Huertas Torres
(74) *Attorney, Agent, or Firm* — Workman Nydegger

(57) ABSTRACT

Displaying overlapping windows from a client device. Windows are displayed at a client device with a first window overlapping a second window on a single display. The first window is a current window. The current window is based on front to back ordering of windows displayed at the client device. Pixels in a region of the first window are captured and sent to a display server. At the display server, the first window is displayed on a first display region. The second window becomes the current window, resulting in capturing and sending pixels in a region of the second window to the display server. At the display server, the second window is displayed on a second display region. At the display server, the first and second windows are displayed in a non-overlapping fashion by displaying the first window and the second window on separate display regions.

19 Claims, 11 Drawing Sheets

(56) References Cited

OTHER PUBLICATIONS

Beaudouin-Lafon, M. , "Novel Interaction Techniques for Overlapping Windows," In Proceedings of the 14th Annual ACM Symposium on User Interface Software and Technology, Orlando, FL, Nov. 11-14, 2001, UIST '01, ACM, NY, NY, pp. 153-154.

Berry, L. et al., "Role-Based Control of Shared Application Views," In Proceedings of the 18th Annual ACM Symposium on User Interface Software and Technology, UIST 2005, ACM Press, pp. 23-32.

Biehl, J.T. et al., "Impromptu: A New Interaction Framework for Supporting Collaboration in Multiple Display Environments and its Field Evaluation for Co-Located Software Debelopment," In Proceedings of the 26th Annual SIGCHI Conference on Human Factors in Computing Systems, Florence, Italy, Apr. 5-10, 2008, CHI '08, ACM, NY, NY, pp. 939-948.

Bly, S.A. et al., "A Comparison of Tiled and Overlapping Windows," In Proceedings of the SIGCHI Conference on Human Factors in Computing Systems, Boston, MA, USA, Apr. 13-17, 1986, M. Mantei and P. Orbeton, Eds. CHI '86, ACM, NY, NY, pp. 101-106.

Gosling, J., The News Book: An Introduction to the Networked Extensible Window System, Sun Microsystems (1989.).

Jiang, H., et al., "LivOlay: Interactive Ad-Hoc Registration and Overlapping of Applications for Collaborative Visual Exploration," In Proceedings of the 26th Annual SIGCHI Conference on Human Factors in Computing Systems, Florence, Italy, Apr. 5-10, 2008, CHI '08, ACM, NY, NY, pp. 1357-1360.

Linton, M.A., et al., "Composing User Interfaces with Interviews," Computer 22, 2, (Feb. 1989), pp. 8-22.

Liu, Z., Lacome: A Cross-Platform Multi-User Collaboration System for a Shared Large Display, Computer Science, University of British Columbia, 2007.

Mynatt, E.D. et al., "Flatland: A New Dimensions in Office Whiteboards," In Proceedings of the SIGCHI Conference on Human Factors in Computing Systems, The CHI is the Limit, Pittsburgh, PA, USA, May 15-20, 1999, CHI '99, ACM, NY, NY, pp. 346-353.

NEC Short Throw Projector, http://www.nec-pj.com/products/wt/index610.html.

Ratto, M. et al., "The Activeclass Project Experiments in Encouraging Classroom Participation," In Proceedings of CSCL 2003.

Richardson, T. et al., "Virtual Network Computing," IEEE Internet Computing, vol. 2, No. 1, 1998.

Tarasewich, P. et al., "Protecting Private Data in Public," In CHI '06 Extended Abstracts on Human Factors in Computing Systems (CHI 2006). ACM Press, pp. 1409-1414.

Tee, K. et al., "Providing Artifact Awareness to a Distributed Group Through Screen Sharing," In Proceedings of the 2006 20th Anniversary Conference on Computer Supported Cooperative Work, (Baniff, Alberta, Canada, Nov. 4-8, 2006, CSCW '06, ACM, NY, NY pp. 99-108.

Tritsch, B., Microsoft Windows Server 2003 Terminal Services, Microsoft Press 2003.

Scheifler, R.W. et al., "The X Window System," ACM Transactions on Graphics, vol. 5(2), Apr. 1986, pp. 79-109.

Notice of Allowance dated Feb. 10, 2012 cited in U.S. Appl. No. 12/816,992.

Office action dated Jan. 31, 2012 cited in U.S. Appl. No. 12/816,984.

\* cited by examiner

DISTRIBUTING MULTIPLE CLIENT WINDOWS USING A DISPLAY SERVER

CROSS-REFERENCE TO RELATED APPLICATIONS

This application claims the benefit of U.S. Provisional application 61/268,991 filed Jun. 17, 2009, titled "Wireless distribution and control of computer", which is incorporated herein by reference in its entirety.

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Computing has become a dominant mechanism for sharing images during meetings. Many conference rooms and lecture halls have one or more projectors for displaying images that everyone in the room can see. These installations often use a VGA cable as the means for connecting personal computing devices to the shared projector in the room.

The cable may be awkward to deal with. The personal computing device is tethered tightly to the projection system allowing little or no mobility. The electrically defined protocol means that there are continual hardware negotiations on screen resolution and synchronization.

VGA connectors are usually too large for handheld computers requiring specialized adaptors or an inability to use handheld computers with projectors.

The VGA (or DVI, HDMI, S-Video) or any other video cable solution enforces a limit of at most one public screen per personal device. Complex topics may have more information than can be properly displayed on a single screen. In comparison, classrooms regularly have 40+ linear feet of blackboard space while digital presentation is frequently confined to 7-10 feet.

Typically, only a single personal computing device can have access to the projector, and thus the presentation display at one time.

Audience members typically have no access to the presentation space. Someone asking a question or offering an alternative from the audience can only speak as there is no simple provision for them to show to what they are referring.

Audience members typically have no digital access to the digital information being displayed. In particular, they cannot copy, or insert digital comments on the information being presented.

In typical VGA type scenarios, the projector displays exactly what is on the personal computing device screen. If the size of the personal computing device screen requires windows to be stacked and thus only partially visible, that same view will be seen on the presentation screen irrespective of how much space or how many presentation screen are available.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment is directed to a method of displaying windows from a client device. The method includes displaying a plurality of windows on one or more displays at a client device. The windows are displayed with a first window overlapping a second window on a single display thus obscuring at least a portion of the second window. The first window overlapping the second window is a current window. The current window is the current window based at least on the front to back ordering of windows displayed at the client device. The method further includes, as a result of the first window being the current window, capturing and sending pixels in a region of the first window to a display server. At the display server, the first window is displayed on a first display region. The method further optionally includes determining that the second window should be the current window based on a change in front to back ordering of windows displayed at the client device. In this embodiment, the second window to become the current window, resulting in capturing and sending pixels in a region of the second window to the display server. At the display server, the second window is displayed on a second display region. At the display server, the first and second windows are displayed in a non-overlapping fashion by displaying the first window and the second window on separate display regions.

A similar embodiment may be implemented that is not dependent on the second window becoming a current window. Rather, the embodiment includes updating information that could be displayed in the second window at the client device in an area of the second widow that is obscured by the first window, while obscured by the first window. This embodiment includes graphically rendering the information that could be displayed in the second window at the client device in an area of the second widow that is obscured by the first window to an off-screen image memory, rather than to the display at the client device. This embodiment further includes capturing and sending pixels in the off-screen image memory to the display server, where they are display in the non-overlapping fashion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein allowing personal computing devices to annex display services over a network rather than a video cable. Network-based display services open many new possibilities for shared use of digital display space.

Figure 1:
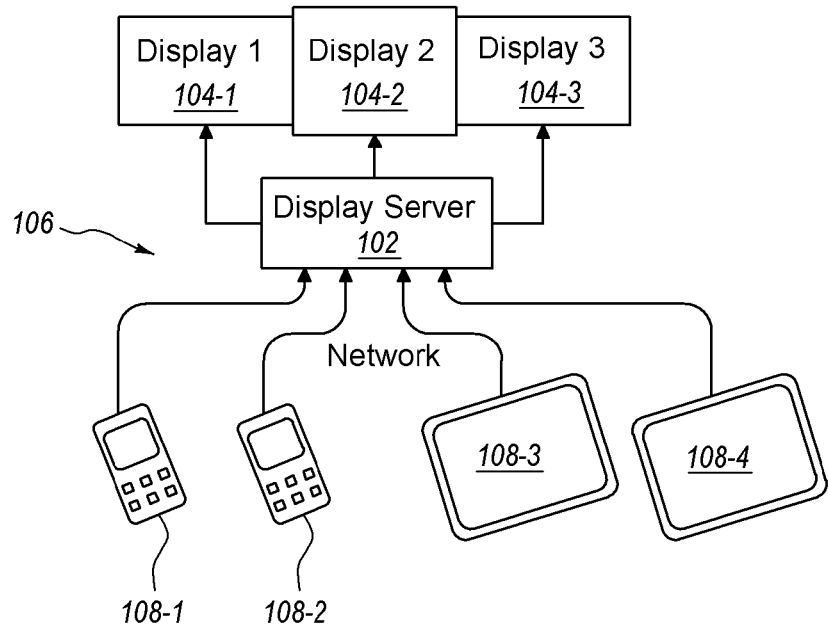
FIG. 1 illustrates a display server architecture.

Referring now to FIG. 1, a display server architecture is illustrated. In particular, FIG. 1 illustrates a display server 102, which is a computing device attached to (which may be referred to herein as including), one or more displays 104-1, 104-2 and 104-3 (referred to herein generically as 104). The display server 102, in some embodiments, has complete control over drawing on the attached displays 104. The hardware implementation of this attachment may be accomplished in any one of a number of different fashions, including wired video connections such as one or more of VGA, DVI, HDMI, S-Video, component video, composite video, etc or wireless video connections. Various geometric arrangements of the displays relative to each other may also be used. However, it is useful for the display server 102 to know what arrangement is use and to be able to effectively access pixels displayable by the displays 104 in a uniform coordinate system.

Display servers 102 may be installed at a particular location. Such installations may be a classroom, a conference room, a team working room, a presentation hall or a personal office space. Server software runs on the display server 102. The display server 102 may be connected to a digital communications network 106. Software creating displayable subject matter to be displayed by the display server 102 may be running directly on client devices 108-1, 108-2, 108-3 and 108-4 (referred to herein generally as 108) possessed by the users, such as participants or presenters of a meeting. Client devices 108 may be portable and may include handheld computers, cell phones, tablets, or laptops or any other appropriate computing device. Client devices 108 may annex a display server 102 for the purpose of showing information on that display server 102. These images may be static images stored on the client device 108 or on some other storage device accessible to the display server 102 over the network 106. Alternatively, the images may be more dynamic in nature in that they are produced by playing videos stored on the client device 108 or some other service. Alternatively, these images may be generated by continually distributing graphical information from applications running on a client device 108 to the display server 102. The content being presented is typically under the control of a client device 108 with the display server 102 merely visually presenting the content. Audio content may also be presented in similar fashion.

More than one client device 108, as illustrated in FIG. 1, may annex a display server 102 at any given time. Mechanisms, as described below in more detail, may be provided to control this sharing of the display service.

Communication between the client devices 108 and a display server 102 may be in terms of a presentation control protocol (PCP). It is through this protocol that client devices share presentation information and provide control over that presentation.

It may be useful to in some embodiments to implement a presentation control protocol that is relatively static. That is the protocol remains relatively unchanged. Any user carrying a client device 108 that implements the PCP will be able to use any display server 102 that they encounter. This allows users to nomadically carry their computing in their personal client devices 108 and use display resources freely as they find them. This also means that the interactive techniques or services for using display services are implemented in the user's client device 108. By using a static protocol, users would not need to relearn how to control or use each display service that they find. They bring their user interface, as implemented by their client device 108, with them and it works regardless of the display server 102 implementation. This is facilitated by a static, or infrequently changed, PCP. Client devices 108 can implement any interactive style that they choose and it works on a display server 102 compliant with the PCP.

While in alternative embodiments the PCP is less static, this may require updates to client devices that wish to use the display server, depending on the changes that are made to the PCP implemented at the display server. While PCP changes may inevitably occur, by concentrating on display related functionality in the display server the number of PCP changes can be limited. Therefore an architecture that focuses on putting user interface and control functionality into clients, while minimizing or eliminating such controls at the display server will create a more functional and dynamic system.

Figure 2:
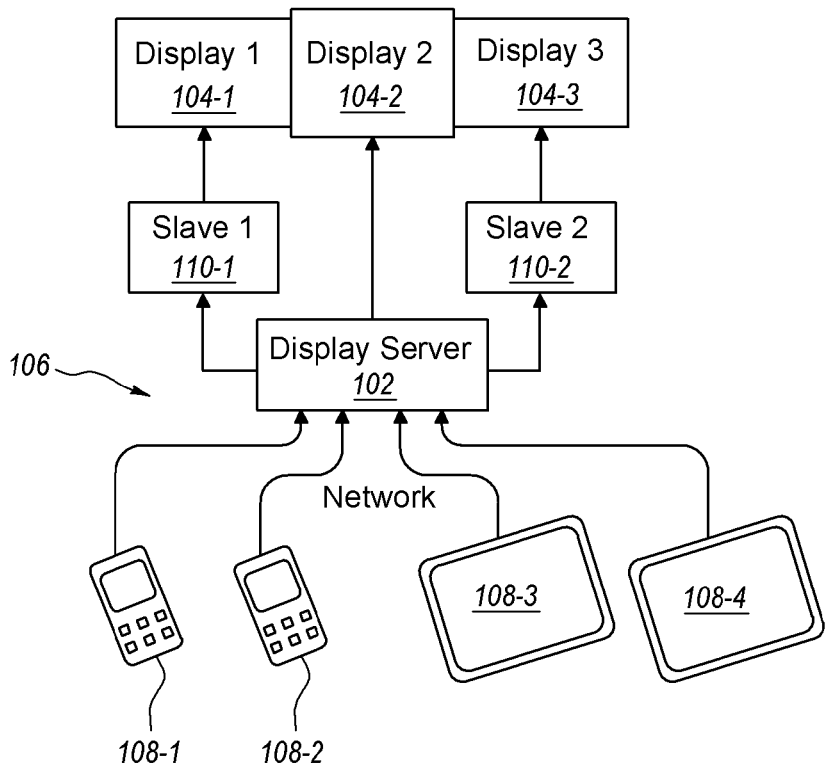
FIG. 2 illustrates an alternate display server architecture.

As illustrated in FIG. 2, the display server 102 may be implemented using multiple computing devices. Each computing device controls one or more displays 104 or in some embodiments, display regions, which are regions not necessarily bounded by an entire display. Rather a display region may be a portion of a display including less than all of the display, or in fact may be portions of two or more displays. There is a master display server 102 that accepts client device 108 control requests and forwards them to the appropriate slave server(s) 110-1 and 110-2. From the perspective of the client devices 108 the architecture is the same as that illustrated in FIG. 1. Only the display server 102 implementation is different. The same PCP can be used either for both the architecture illustrated in FIG. 1 and the architecture illustrated in FIG. 2.

The following are example scenarios for how these architectures may be used in practice. In a first example, a presentation scenario is shown. In this scenario, a person brings their personal client device 108 into a room that contains one or more displays 104 controlled by a display server 102. They establish a connection to the display server 102 by means of a user interface implemented on their client device 108. They then proceed to use any or all of the displays 104 to present information stored on either their client device 108 or some other service available over the network 106 (or some other network, such as an external wired or wireless, cellular, or other network).

Another example includes a moderated meeting scenario. In this example, there may be a room where several presentations are to be made. A moderator for the meeting enters the room and annexes the display server 102 from his personal client device 108 using whatever user interface is implemented on his client device 108. Various presenters also enter the room and annex the display server 102 using their client devices 108. The moderator has control of the display server 102 and may dictate the information that each of the presenters is allowed to show on the shared displays 104. The moderator may also dictate when each of the presenters is allowed to show information from their client devices. The control of who may show what and when is provided through a user interface implemented on the moderator's personal client device 108. The user interface provided on the moderator's device need not correspond to any of the user interfaces on the presenters' client devices 108. Each participant controls their own information using their own familiar tools on their own devices. The display server 102 merely enforces the control exerted by the moderator's client device 108.

The following scenario illustrates an example where audience participation is facilitated. Whether there is a single presentation or a moderated meeting there may be an audience present. Some of the audience members may posses their own client devices 108. The audience members can annex the room's display server 102 as watchers rather than presenters. A watcher has the privilege of requesting a digital copy of whatever is being presented on the shared displays 104. The display server 102 will take a copy of whatever is being displayed and return it to the watcher's client device 108. The watcher can then use that image as part of note taking or insert the image into other data using other client device software on their client device 108.

At some point in the presentation a watcher may have a question about a previous point in the presentation. They can then repost any images that they copied from the presentation or new material of their own to illustrate their question. Their ability to post is controlled by the moderator or the presenter if there is no moderator. The moderator's user interface for controlling the conversation is on his own device and independent of the implementations on any of the other client devices 108.

The following scenario illustrates an example where discussion is facilitated. A discussion may be where several people attend a meeting in a room with a display server 102. Each of them brings a personal client device 108 with whatever information or applications that they desire. Each annexes the room's display server 102. Each can use the display server 102 to post information or application instances to one or more displays 104 that they feel are relevant to the discussion. Depending on the size of the group, the amount of shared display space and the nature of the task, there are various ways in which the display space may be managed. One way is for each participant to have the right to move anything around anywhere. This is a free form style that works with cooperative teams and where social norms rather than software rules are effective. It is also possible to allow each user to control their own material but not that of anyone else. The problem is who will decide what to do when material from two different users overlaps. The group may be formal enough that it facilitates a moderator who controls what is presented and when it is presented. Thus, embodiments may be implemented where individuals in the room can contribute information to the shared display space and all control models are not necessarily hardcoded into a display server 102 implementation, but rather some human moderated control is allowed.

The following scenario illustrates an example where personal use is facilitated. Display service architectures may also be used by a single individual. A personal workspace may be populated with several display devices. The user enters his workspace with a personal client device 108 that then annexes the display server 102. The user can now use all of the presentation space for their own purposes and then take it all with them.

The following now illustrates various techniques for distributing graphics. Embodiments may include the ability to distribute graphical information over a network from a client to a display server 102. Discussed herein are three basic mechanisms for this distribution: 1) pixels, 2) draw commands and 3) display lists.

Some pixel mechanism embodiments are the most general because they depend solely upon the pixels being displayed with no dependence on the operating system, graphics toolkit or the applications being run. A region of the client's display frame buffer is designated as being shared with the display server 102. Periodically a process in the client device 108 samples all of the pixels in that region and ships them to the display server 102 who paints them in an appropriate location on one of the displays 104. In some embodiments, efficiencies can be obtained by first comparing the pixels just extracted from the frame buffer to pixels previously sent out. Only the differences are sent. This can sharply reduce the demand for network bandwidth. There are potentially other algorithms that can be used to reduce the bandwidth required for distributing pixels. Pixel distribution, while expensive in terms of client CPU load and network bandwidth, is useful at least in that it can be at least somewhat independent of whatever graphics model, operating system or user interface toolkit is implemented on a client device 108.

The draw commands distribution approach involves capturing the drawing calls made by applications (draw line, draw ellipse, draw text, etc.), serializing the parameters of those calls and then forwarding them to the display server 102. The display server 102 then executes those draw commands in the same fashion as they would have been implemented on the client device 108. Embodiments of this approach can be cheaper in terms of client CPU usage because there is no need to examine all the pixels for changes. Further, some of these embodiments may take less network bandwidth than the pixels technique. In some embodiments using this technique, drawing models of both the display server 102 and all client devices 108 are identical.

The display lists distribution approach is an efficient technique. A data structure built of draw commands is created by the application and shared with the drawing subsystem. The application changes the data structure and the drawing system redraws the content in that structure. In terms of distribution, in some embodiments, only the changes to the display list (generally very small) need be serialized to the display server 102. This conserves client CPU time and network bandwidth.

Some embodiments described herein may use any one of these three techniques, while other embodiments may be limited to only one of the techniques.

Screen space may be controlled by window management software. This software breaks the display into independent regions (windows) that may or may not overlap. Window management allows users to move windows around the screen, change which windows are on top, resize windows, close windows and iconify windows to put them out of the way. There are a variety of styles, from the "cluttered desktop" model found on many personal computers, tiled layouts, styles that prevent overlap by resizing and styles that can "zip" windows together so that they can be manipulated as a unit.

Using the standard VGA approach to presentations there is no need for a window management solution. The client device screen is duplicated on the projector and whatever window management is running on the client device also runs on the projector. There is only one user/computer involved so there are no additional management responsibilities. However, in some embodiments outlined herein, window management is taken into consideration. In particular, by untying presentations from the standard VGA approach, windows management becomes more pertinent to the implementations. Some embodiments may address windows management issues related to users making a presentation using multiple screens such that there is more screen space for the presentation than there is space on the presenter's device. This means that traditional window management techniques running on the client device 108 may not map directly to the windows management of the display server 102.

Some embodiments may address windows management issues related to providing a presenter with familiar windows controls. Additionally, some embodiments may address issues related to traditional window management. For example, many traditional systems are based on fine-precision mouse manipulation. One may not want to do those things in the middle of a presentation. One may wants to focus on the presentation. Thus, some embodiments may implement features with different window management techniques.

Some embodiments may address windows management issues related to allowing each presenter to have their own model of how they want to use the presentation space. Some embodiments may provide presenters the opportunity to use their own tools. Some embodiments may implement features to address the role of a moderator. Some embodiments may include functionality to allow the moderator, not any of the presenters, to control the visibility of windows.

Some embodiments may address windows management issues related to audience participation. When the audience begins to participate in the presentation the window management problem becomes more complex. When each audience member has their own client devices 108 and tools it may be difficult to impose restrictions on the client devices 108. Frequently audience members will be working from handheld devices with even less screen space for window management. Some embodiments may address some of these issues by allowing a presenter or moderator to retain control of items that can appear on a display 104 and their ultimate disposition.

Some embodiments may address windows management issues related to discussions. A discussion generally occurs among people who are working together for a common goal. As such, many of the control issues can be relaxed relative to a presentation experience. There are now many users displaying their data on a screen 104. There are a variety of ways in which control might be exerted and a variety of ways in which software might facilitate the management of the space. In discussion scenarios there may be many screens (e.g. 10 or more) with information displayed all around the room. In some embodiments implemented in these types of scenarios, window management, rather than being managed by a single individual, may be distributed among the participants.

Some embodiments may also address issues related to access control. In particular, it may be useful to provide control over who can present and where. Even a single presenter may have use for a mechanism to take control of the display 104 from client devices 108 or individuals that may have been using it previously. When there is audience participation there may be use for mechanisms to control who may put things up on the screen and possibly preview what they will display. In a discussion there may be use for policy about who can move what things around the display space, where they can put them, whose things an individual can move etc. In some embodiments, these access controls and policies are not built into the server, but rather a general architecture for access control with the ability for one or more client devices 108 to provide users with that access control may be implemented.

Figure 3:
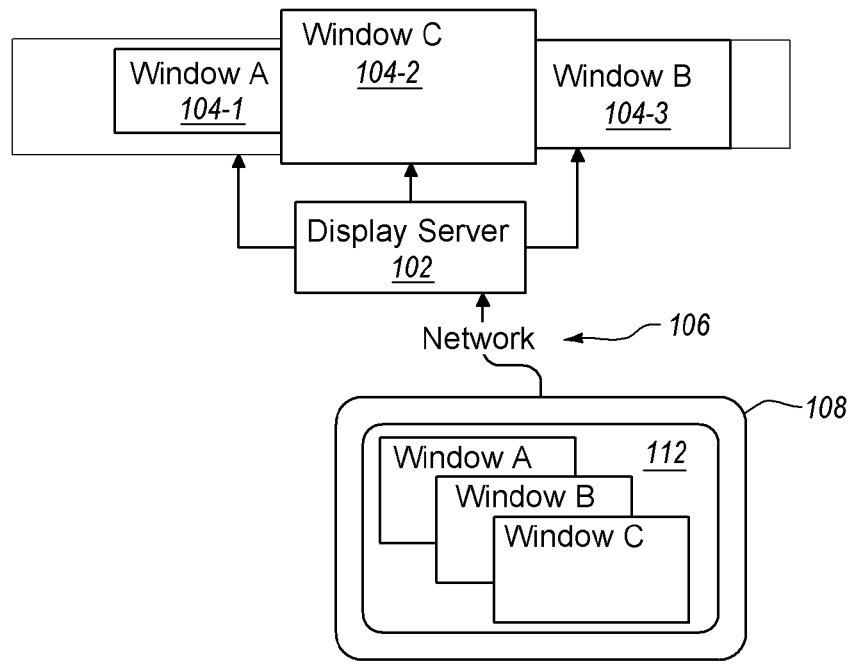
FIG. 3 illustrates spreading windows at a display server.

Referring now to FIG. 3, an embodiment is illustrated that uses pixel-based distribution and controls pixel copying based on which window is on top on a user's client device 108 display. Pixel-based distribution of graphics involves capturing a segment of pixels from a frame buffer and distributing them to a display server 102 for presentation on one or more displays 104. By definition, this distribution of pixels is not larger than the screen space available on display 112 of the client device 108. However, there are many situations where the display server 102 has much more screen space available than the client device 108. Embodiments can take advantage of this by using window information to translate the overlapping windows (windows A, B, and C) on a client device 108 into a spread out configuration on the displays 104-1, 104-2, and 104-3 (as shown in FIG. 3). This may be particularly valuable on handheld devices where the common window management technique is to show only one window at a time.

In the example shown in FIG. 3, on the client device 108, windows A and B are obscured and their content cannot be seen or is only partially visible. However, at the display server 102, all of windows A and B are visible on the displays 104-1 and 104-3. This may be accomplished by controlling the streaming connection between a window on the client device 108 and a window on the display server 102.

Figure 4:
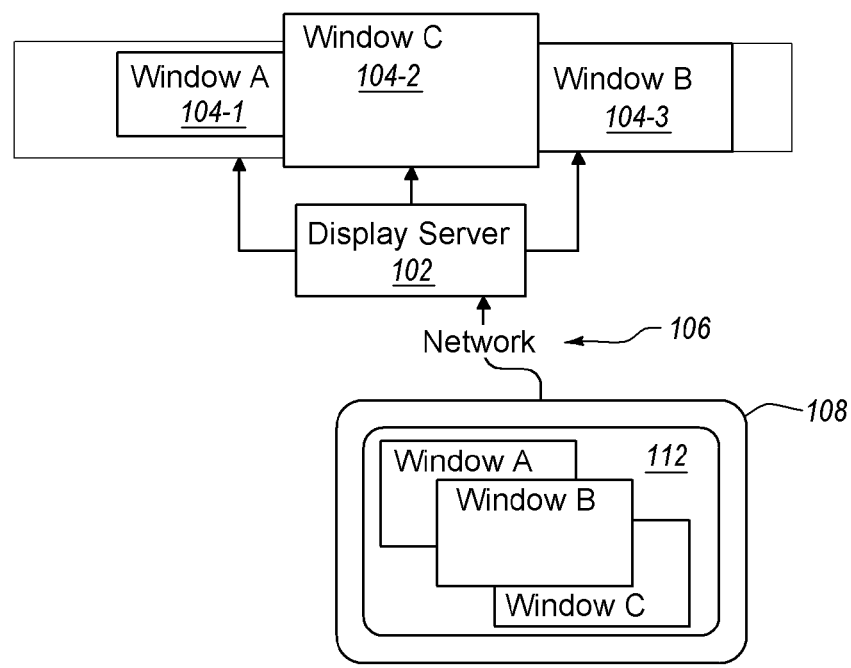
FIG. 4 illustrates another example of spreading windows at a display server.

A desktop (or portable device) windowing system may provide system calls that will provide the following information: (1) the location, size and front-to-back ordering of all windows on the desk top; and (2) a unique identifier for each window. In some embodiments there is a "current window" on the client device 108 that is being streamed. In the example shown in FIG. 3 this is window C. In some embodiments, only the pixels in the region controlled by the current window are captured for distribution to the display server 102. Before each pixel capture, the client software checks with the windowing system to see if the current window has any other windows in front of it. If not then the pixels of the current window are distributed to the display server 102 (Window C in FIG. 3). If there is another window in front of the current window, and the other window in front of the current window is a distributed window (i.e. is intended to be distributed to the display server 102) then pixel capture on the current window is terminated and the new front window becomes the current window. If the new front window is one that it is being distributed, then its pixels are now captured and distributed to the display sever 102. An example of this new situation is illustrated in FIG. 4 where Window B is the new current window. The last captured pixels for windows A and C are still displayed, but they are not currently being captured by the client device 108 and updated at the display server 102.

However, as illustrated below, alternate embodiments may be implemented where pixels for windows A and C can continue to be captured at a client device 108 and stored in an off-screen memory at the client device. The pixels can then be sent to the display server 102.

The unique id of each client window is associated with a window on the display server 102. This allows for the clean connection between client windows and their surrogates on the display server 102.

Thus, embodiments may be implemented to use pixel-based distribution to expand overlapping windows on a display 112 of a client device 108 to be separate non-overlapping windows on displays 104 of a display server 102, thus expanding the display ability of the client device 108.

Some embodiments may be implemented such that when there is a non-distributed window that overlaps the current window, the privacy of the non-distributed window can be protected by blocking the transmission of pixels of the non-distributed window. In particular, a non-distributed window is one that should not be distributed to the display server. For example a user at the client device 108, or policy at the client device itself, may determine that a particular window should not be distributed to the display server. In one embodiment, the non-distributed window may be an alert message or a file dialog box that provides no real useful information for meeting participants and thus should not be distributed. For example, the non-distributed window may include information about a client device 108 and/or its files, such as might be shown in a file dialog box. In other embodiments, the window may simply include information that a user does not want shared.

In some embodiments, when a non-distributed window overlaps a distributed window, the privacy of the non-distributed window can be protected by blocking the transmission of only those pixels of the distributed window overlapped by the non-distributed window, as well as the pixels of the non-distributed window. The other pixels of the distributed window continue to be captured and transmitted.

In some embodiments, when there is a non-distributed window that overlaps the current window, the privacy of the non-distributed window can be protected by taking the pixels of the current window that were captured before overlap and modifying them by blending them with some highlight color. In one embodiment, the highlight color may be gray. These modified pixels are distributed to the display server 102 to show that those pixels are not currently being updated. The pixels of the non-distributed window overlapping the current window are then blocked. Once the non-distributed window is moved or no longer in front of the current window, the pixels of the current window previously overlapped are once again available to send to the display server 102.

In one embodiment, information about non-current windows can be stored in an off-screen memory at the client device 108. This information can then be sent to the display server 102 where it can be displayed. Thus, in this example, there is a first window that overlaps a second window on the display at the client device 108. Whenever the information to be display in the second window is updated, that information is graphically-rendered, including any overlapped region, to an off-screen image memory. At least some pixels in the off-screen image memory are not displayed at the client device 108. The off-screen image memory is then used to transmit the pixels of the second window to the display server 102. In this embodiment, the windows displayed at the display server 102 may be current even for windows that are obscured at the client device 108.

Figure 5:
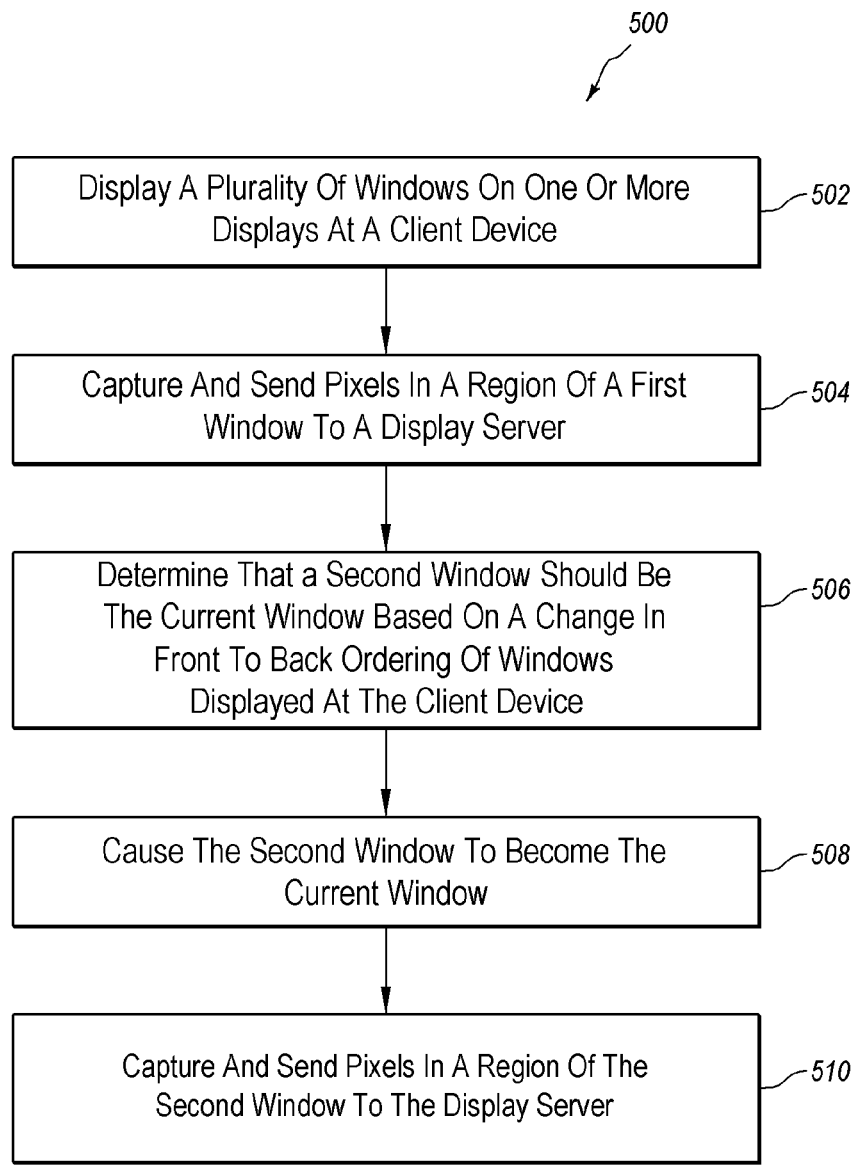
FIG. 5 illustrates a method of a method of displaying windows from a client device.

Referring now to FIG. 5, a method 500 is illustrated. The method 500 may be practiced in a computing environment and includes acts for displaying windows from a client device (such as a client device 108). The method includes displaying a plurality of windows on one or more displays at a client device (act 502). The windows are displayed with a first window overlapping a second window on a single display thus obscuring at least a portion of the second window. The first window overlapping the second window becomes a current window. The current window is the current window based at least on the front to back ordering of windows displayed at the client device. For example, as shown in FIG. 3, window C may be the current window as it is the foremost distributed window.

As a result of the first window being the current window, the method 500 further includes capturing and sending pixels in a region of the first window to a display server (act 504). At the display server, the first window is displayed on a first display region. For example as illustrated in FIG. 3, pixels from window C are captured at the client device 108 and sent to the display server 102. These pixels are displayed in the display 104-2. Notably, display regions are regions that may be, but are not necessarily bounded by an entire display. Rather a display region may be a portion of a display including less than all of the display, or in fact may be portions of two or more displays.

The method 500 further includes determining that the second window should be the current window based on a change in front to back ordering of windows displayed at the client device (act 506). For example, as shown in FIG. 4, window B moves to the front of the ordering and thus it can be determined that window B should be the current window.

The method 500 further includes causing the second window to become the current window (act 508). For example, as illustrated in FIG. 4, window B becomes the new current window.

As a result of the second window being the current window, the method 500 further includes capturing and sending pixels in a region of the second window to the display server (act 510). At the display server, the second window is displayed on a second display region. Further, at the display server, the first and second windows are displayed in a non-overlapping fashion by displaying the first window and the second window on separate display regions while the windows are displayed with overlap of the first window and the second window on the single display at the client device. Thus, for example as illustrated in FIGS. 3 and 4, windows A, B, and C continue to overlap on the display 112 at the client device 108, but are non-overlapping at the display server 102 because window A is only displayed on display 104-1, window C is only displayed on display 104-2, and window B is only displayed on display 104-3.

Figure 6:
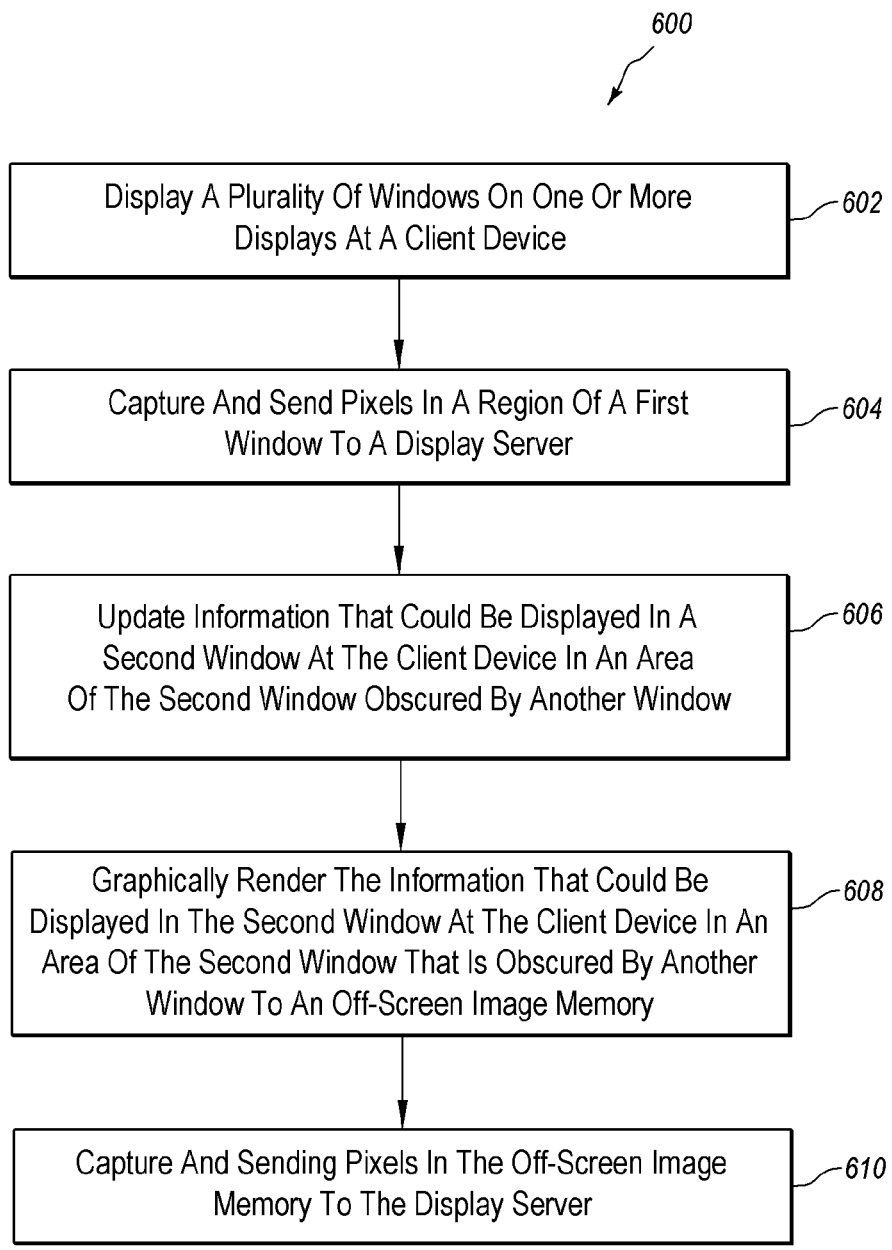
FIG. 6 illustrates an alternate method of displaying windows from a client device.

FIG. 6 illustrates a similar method 600 except that the method 600 may utilize an off-screen image memory for overlapped windows so as to allow of up-to-date streaming of windows even when they are overlapped. The method 600 may be practiced in a computing environment and includes acts for displaying windows from a client device. The method 600 includes displaying a plurality of windows on one or more displays at a client device (act 602). The windows are displayed by displaying a first window and a second window.

Another window overlaps the second window on a single display thus obscuring at least a portion of the second window. In some embodiments, the first window may be the other window. In other embodiments, the other window may be a non-distributed window that is not intended to be shared with the display server. Still other windows may be the other window.

The method 600 further includes capturing and sending pixels in a region of the first window to a display server (act 604). At the display server, the first window is displayed on a first display region.

The method 600 further includes updating information that could be displayed in the second window at the client device in an area of the second widow that is obscured by the other window, while obscured by the other window (act 606). For example, as illustrated in FIG. 3, even though window C is the current window, information for window B may be updated by applications running on the client device 108. Although, these updates would not be completely visible on the display at the client device 108.

The method 600 further includes graphically rendering the information that could be displayed in the second window at the client device in an area of the second widow that is obscured by the other window to an off-screen image memory (act 608). Thus, in the example illustrated, while the changes may not be rendered to the display 112, the changes could none-the-less be rendered to an off-screen image memory that stores pixel data.

The method 600 further includes capturing and sending pixels in the off-screen image memory to the display server (act 610). At the display server, the second window is displayed on a second display region. At the display server, the first and second windows are displayed in a non-overlapping fashion by displaying the first window and the second window on separate display regions.

Figure 7:
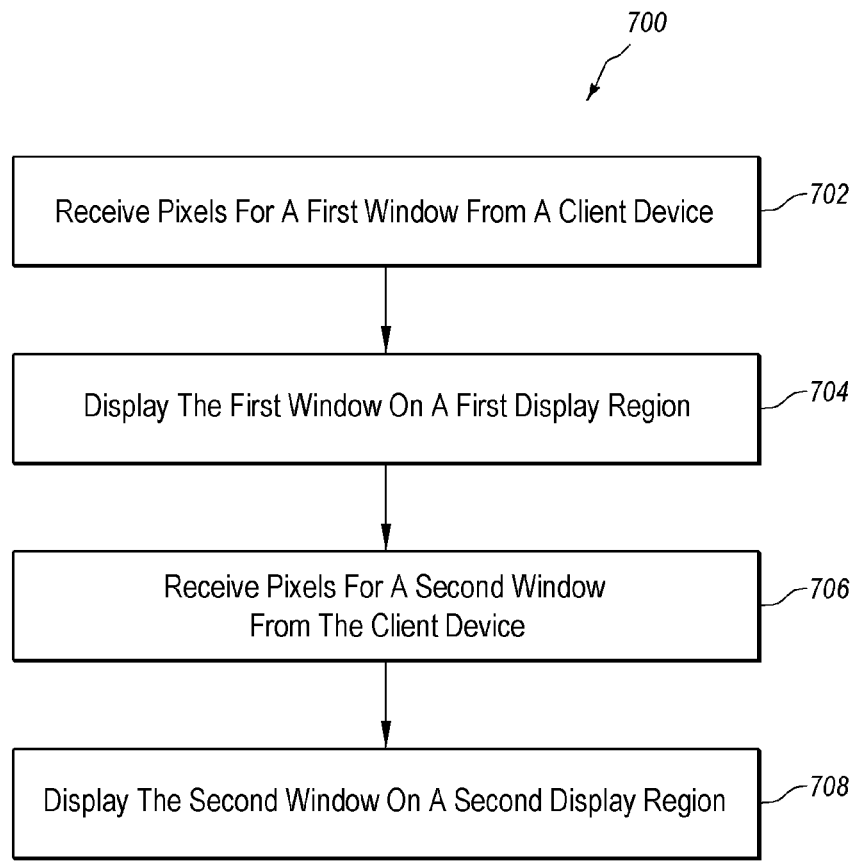
FIG. 7 illustrates yet another method of displaying windows from a client device.

Referring now to FIG. 7, a method 700 is illustrated from the perspective of a display server. The method 700 may be practiced in a computing environment and includes acts for displaying windows from a client device.

The method 700 includes receiving pixels for a first window from a client device (act 702). At the client device, a plurality of windows are displayed on one or more displays at a client device. The windows are displayed with the first window overlapping a second window on a single display thus obscuring at least a portion of the second window.

The method 700 further includes displaying the first window on a first display region (act 704). For example, as illustrated in FIG. 3, window C may be displayed on the display 104-2.

The method 700 further includes receiving pixels for the second window from the client device (act 706). For example, the display server 102 may receive pixels for window B from the client device 108.

The method 700 further includes displaying the second window on a second display region (act 708). At the display server, the first and second windows are displayed in a non-overlapping fashion by displaying the first window and the second window on separate display regions while the windows are displayed with overlap of the first window and the second window on the single display at the client device.

Figure 8:
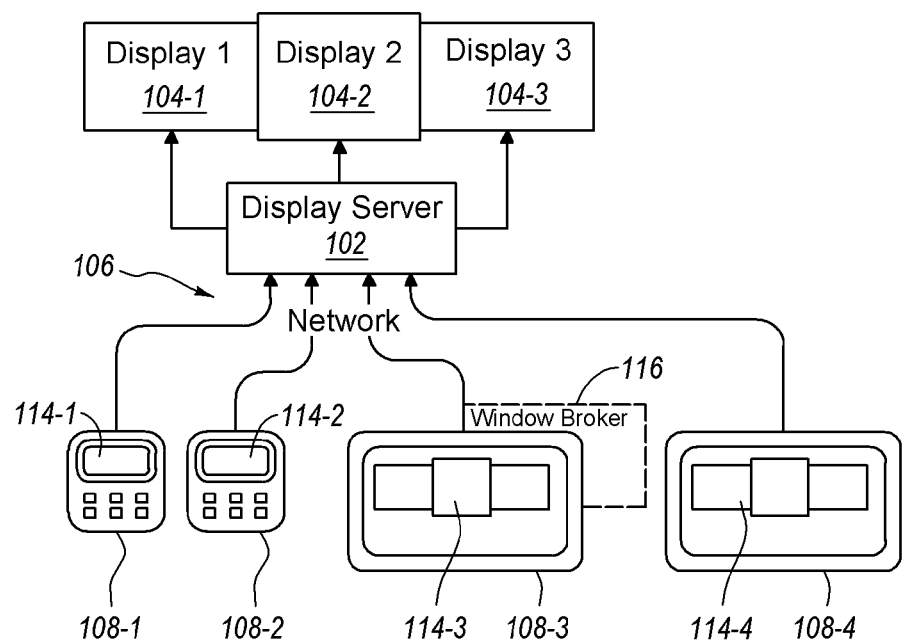
FIG. 8 illustrates a window manager/window broker architecture.

Referring now to FIG. 8, an embodiment is illustrated that implements a window manager/window broker architecture. The architecture may be implemented where window managers 114-1, 114-2, 114-3, and 114-4 (referred to generally as 114) and window brokers 116 are pieces of software running in client devices 108. A window manager 114 implements a visual user interface that allows users to control the location, size and visibility of windows being displayed on a display server 102. A window broker 116 is a piece of software running in a client device 108 that controls permissions and ultimate location, size and visibility of all windows on the display server 102. In some embodiments, at any one time there is exactly one window broker 116 associated with a display server 102. There may be many window managers 114.

The display server 102 has a list of visible windows and an ordered list of shelf windows. Windows "on the shelf" are not visible on the display server 102. Shelf windows, as used herein, are not the same as iconified windows used in many window managers 114. Iconified windows are visible windows with very reduced screen size. Shelf window are not visible but are waiting to be displayed as specified by window managers 114 and approved by the window broker 116.

In some embodiments, there can be any number of window managers 114 and their user interface can be implemented in any of a variety of ways. This diversity of implementations can be used to support the many kinds of client devices 108 (laptops, tablets, cell phones, PDAs, etc.) that can use a display server 102. This diversity also allows for many styles of interaction to meet many different purposes. In some embodiments a window manager 114 communicates with a display server 102 to retrieve the location, size and back-to-front order of all visible windows on the display server 102. This is used by the window manager 114 to show the user the current arrangement of windows.

In some embodiments a window manager 114 communicates with a display server 102 to perform information operations and request operations.

Information operations include: retrieving the location, size and back-to-front-order of all visible windows on the display server; retrieving from the display server 102 any descriptive information about any visible window including its owner, name, contents etc.; retrieving from the display server 102 the order and descriptive information of any windows on the shelf; and receiving notifications of changes to window position, size, visibility or shelf order approved by the window broker 116.

Request operations include requesting the posting of a window either onto a location on the shelf or onto a visible location; requesting a change of position or size of a visible window; requesting a change of position of a window on the shelf; requesting removal of a window; requesting movement of a window to the shelf from a visible location or to a visible location from the shelf.

With these capabilities a window manager 114 can provide its user with control over the windows on a display server 102. In some embodiments, the information operations are always performed. The request operations may be conditional upon window broker 116 approval. When a user requests a change by interacting with their window manager 114 on their client device 108, that change request is sent to the display server 102 which forwards the request to the window broker 116. The window broker 116 may approve the request, deny the request or make arbitrary changes to any or all windows to accommodate the request. The window broker's requests, in some embodiments, are always honored by the display server 102. After the window broker 116 has processed a request and has modified the positions and visibility of various windows in honoring that request, the display server 102 notifies all window managers 114 of the changes that have been made so that their user interfaces can be updated.

It may be the case that a window manager 114 may already know the network address of the window broker 116 either from the display server 102 or by some other means. The window manager 114 may then request approvals directly from the window broker 116 without involving the display server 102. It may be the case that a window broker 116 may know the network addresses of connected window managers 114 either from the display server 102 or by some other means. In such cases the window broker 116 may directly notify window managers 114 of any updates as well as the display server 102.

Some embodiments implement a separation of the display server 102, window manager 114 and window broker 116 to support the goal of any one or a number of different clients being able to interact with windows while one client exerts policy control over all windows.

In some cases a window broker implementation will grant special privileges to the window manager 114 running on the same client device 108 as the window broker 116. This special window manager 114 may be referred to herein as the broker moderator. Broker moderators can have special user interfaces that allow their users to manage the whole space for various purposes. A client device 108 can have a window manager 114 and multiple applications hosting windows on the display space. For clarity, a window belongs to a window manager 114 if that window is hosted by an application running on the same client device 108 as the window manager 114.

Some embodiments implement a window broker 116 that allows any window manager 114 to place windows on the shelf but only allows the broker moderator to move windows off of the shelf and onto the display. This allows any user to request material to be shown but only the broker moderator controlling the meeting can grant actual visibility.

Alternative embodiments implement a window broker 116 that allows any window manager 114 to move windows hosted by that window manager's client device 108 but not the windows of other client devices 108. The broker moderator can move any window.

Alternative embodiments implement a broker moderator that can specify regions of the display space as belonging to particular client devices 108. The window broker 116 will only allow window managers 114 to move windows within their device's assigned space and only if the window belongs to that window manager 114.

Alternative embodiments implement a broker moderator that manages all windows of a particular client as a group. The broker moderator can specify that all windows of a particular client be made visible by moving all other windows to the shelf and all windows of the client to be shown are moved from the shelf to their requested locations. The window broker 116 accepts window manager 114 requests for specific locations but does not honor them until the broker moderator grants that client access to the screen. This provides for moderating of a meeting with multiple presenters. In some examples of these embodiments, the window broker 116 may grant to the currently selected client's window manager 114 the right to position their own windows anywhere.

Embodiments may include functionality for controlling automatic window layout. Often, window management schemes allow any window to be placed anywhere with a back to front order that is managed by which window was positioned or selected last. There are, however, other layout schemes. These schemes are made possible by special window brokers 116 that enforce those schemes. The window manager/window broker architecture is unchanged by these.

Embodiments may be implemented with a window broker 116 that enforces a policy that windows will not overlap. When a window manager 114 requests the placement of a window over the top of other windows, the windows that might be underneath are moved out of the way and possibly scaled down in size to make room by the window broker 116.

Embodiments may be implemented with a window broker/window manager architecture whereby when a window manager 114 requests the placement of a window, the window broker 116 adjusts accordingly by changing the window tiling. The window broker 116 then notifies all window managers 114 and the display server 102 of the new window positions consistent with that tiling.

Various embodiments are illustrated herein by methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Figure 9:
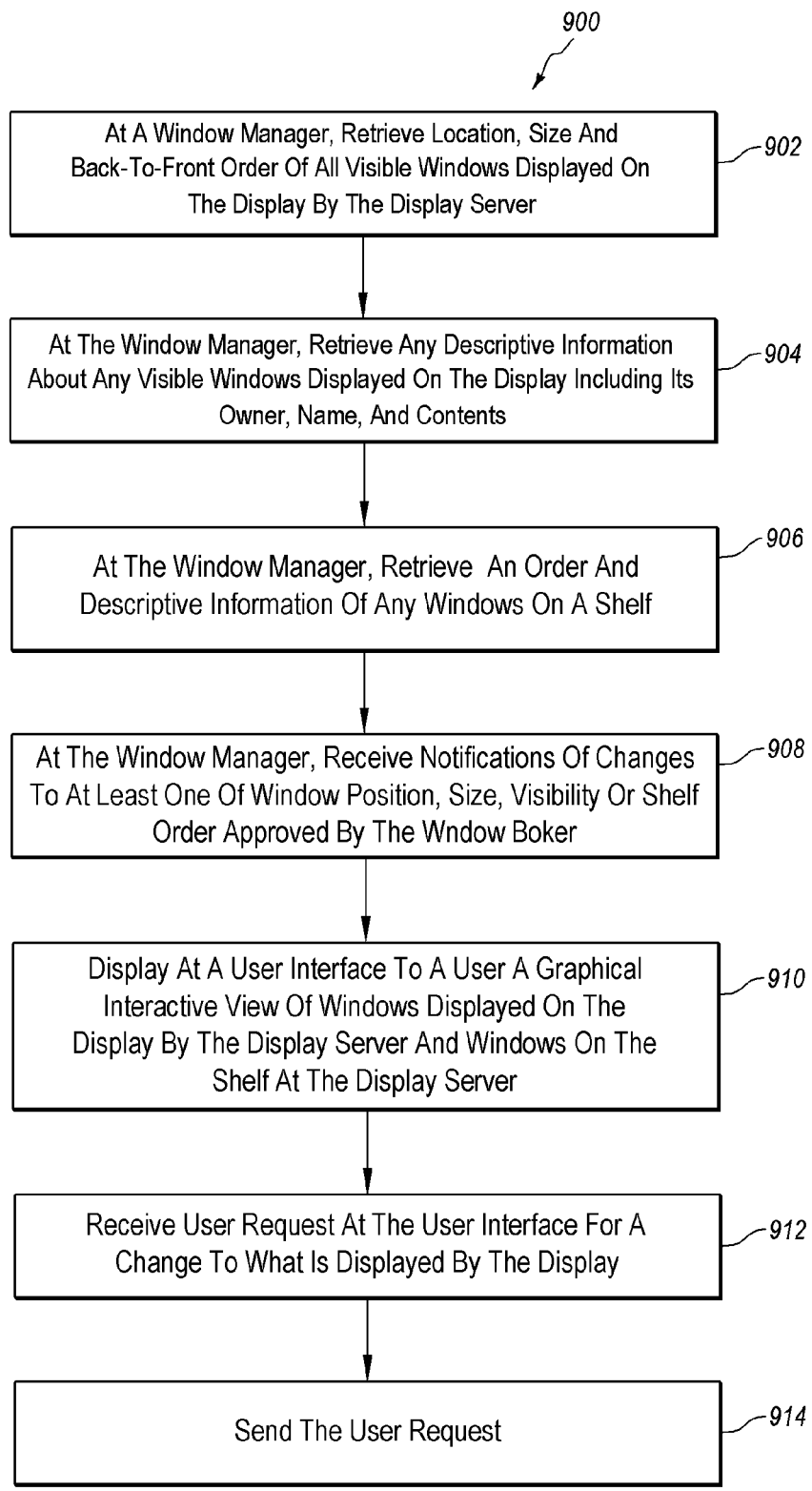
FIG. 9 illustrates a method of retrieving information from a display server.

Referring now to FIG. 9, a method 900 is illustrated. The method 900 may be practiced in a computing environment including a display server. The display server may include a display to display windows in a presentation environment. The computing environment may further include one or more client devices coupled to the display server. The computing environment may further include one or more window managers running on one or more of the client devices. The computing environment may further include a single window broker running on one of the client devices. Each window manager implements a visual user interface that allows users to control location, size and visibility of windows being displayed by the display server. The window broker controls permissions and ultimate location, size and visibility of all windows displayed by the display server. The method includes acts for retrieving information from the display server.

The method 900 includes, at a window manager, retrieving location, size and back-to-front order of all visible windows displayed on the display by the display server (act 902). For example, as illustrated in FIG. 8, the window managers 114 may retrieve information from the display server 102 about what windows are displayed at the display server 102.

The method 900 further includes, at the window manager, retrieving descriptive information about any visible windows displayed on the display including its owner, name, and contents (act 904). Embodiments may be implemented where retrieving includes retrieving from at least one of the display server or from the window broker.

The method 900 further includes, at the window manager, retrieving an order and descriptive information of any windows on a shelf (act 906). Embodiments may be implemented where retrieving includes retrieving from at least one of the display server or from the window broker. As noted, windows on the shelf are not currently displayed by the display server including not being displayed as minimized icons. Rather, windows on the shelf are waiting to be displayed as specified by window managers and approved by the window broker.

The method 900 further includes, at the window manager, receiving notifications of changes to at least one of window position, size, visibility or shelf order approved by the window broker (act 908).

Based on information retrieved from the display server and received notifications, the method 900 further includes, displaying at a user interface to a user a graphical interactive view of windows displayed on the display by the display server and windows on the shelf at the display server (act 910).

The method 900 further includes, receiving a user request at the user interface for a change to what is displayed by the display server (act 912).

The method 900 further includes, sending the user request (act 914). The user request may be sent directly or indirectly to the window broker. In an indirect example, the request may be sent to the display server. At the display server the user request is forwarded to the window broker. For example, the user request may be forwarded to the window broker 116 illustrated in FIG. 8. At the window broker, the windows broker performs at least one of approving the user request, denying the user request or making arbitrary changes to one or more windows to accommodate the user request. The windows broker further sends a window broker request to the display server. The windows broker further notifies all window managers of the changes that have been made. This allows the user interfaces of the windows managers to be updated.

Embodiments may be implemented to facilitate note taking using data from the display server 102. When presentations occur using distributed graphics, the display server 102 now has access to all of the information displayed. This information can be made available to members of the audience using, for example, a wired or wireless network.

Some embodiments may be implemented to use a window manager 114 to display of information on a display space. An audience member can select a particular window to be copied for the purpose of taking notes or retaining a history.

Some embodiments may be implemented to use a window manager 114 to display information on a display space. An audience member can specify a region of the display space (rectangular or some other region) to be copied for the purpose of taking notes or retaining a history.

Some embodiments may be implemented to use the window manager/window broker/broker moderator architecture whereby an audience member can offer captured history images, other images or notes to the presenter or moderator for the purpose of asking questions or making other points. The broker moderator can approve or disapprove such offerings before they are actually presented on the display server 102.

Figure 10:
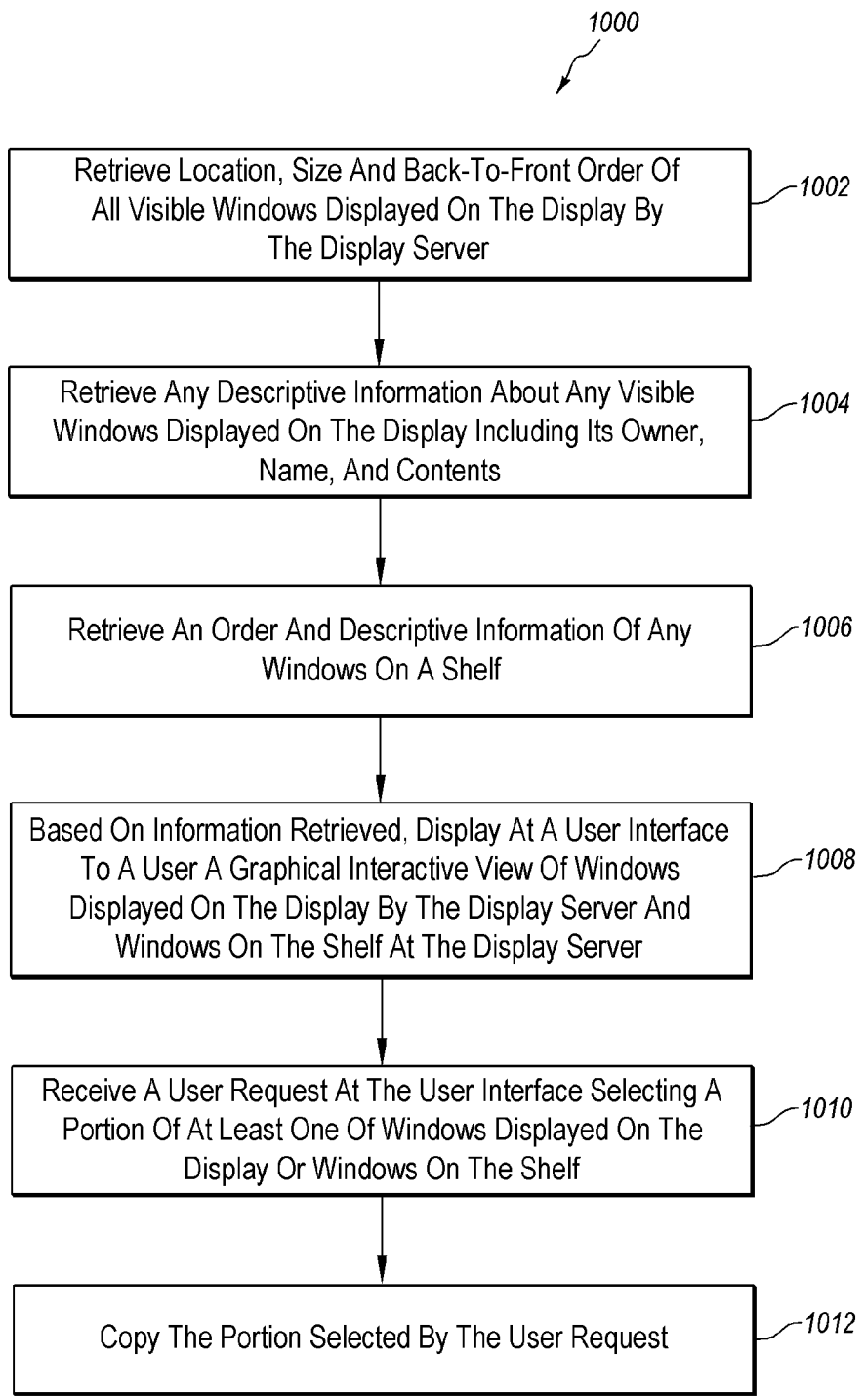
FIG. 10 illustrates an alternate method of retrieving information from a display server.

Referring now to FIG. 10, a method 1000 is illustrated. The method 1000 may be practiced in a computing environment including a display server. The display server may include a display to display windows on the display in a presentation environment. The computing environment may further include one or more client devices coupled to the display server. The computing environment may further include one or more window managers running on one or more of the client devices. The computing environment may further include a single window broker running on one of the client devices. Each window manager implements a visual user interface that allows users to control location, size and visibility of windows being displayed by the display server. The window broker controls permissions and ultimate location, size and visibility of all windows displayed by the display server. The method includes acts for retrieving information from the display server or window broker.

The method 1000 may include, at a window manager, retrieving location, size and back-to-front order of all visible windows displayed on the display by the display server (act 1002). The information may be retrieved from at least one of the display server or the window broker.

The method may further include, at the window manager, retrieving descriptive information about any visible windows displayed on the display including its owner, name, and contents (act 1004). The information may be retrieved from at least one of the display server or the window broker.

The method may further include, at the window manager, retrieving descriptive information (and optionally an order) of any windows on a shelf (act 1006). The information may be retrieved from at least one of the display server or the window broker. Windows on the shelf are not currently displayed by the display server including not being displayed as minimized icons. Rather, windows on the shelf are waiting to be displayed as specified by window managers and approved by the window broker.

The method may further include, based on information retrieved from the display server or the window broker, displaying at a user interface to a user a graphical interactive view of windows displayed on the display by the display server and windows on the shelf at the display server (act 1008).

The method may further include, receiving a user request at the user interface selecting a portion of at least one of windows displayed on the display or windows on the shelf (act 1010).

The method may further include, copying the portion selected by the user request (act 1014). For example, the selected portion may be copied and stored as pixels in a memory buffer, saved as an image file, copied as in image into an application running at a client device, etc.

Figure 11:
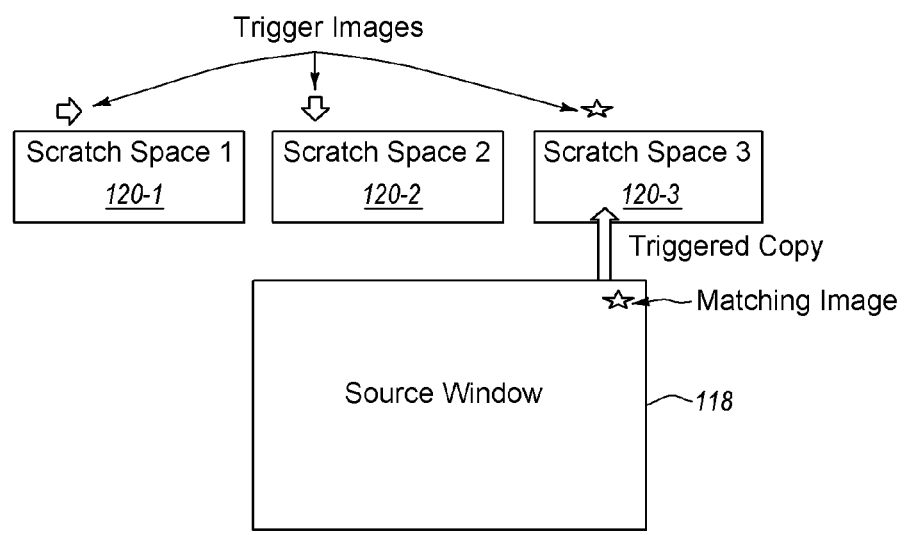
FIG. 11 illustrates using scratch spaces.

Some embodiments may include functionality for implementing scratch spaces. Many presentations are designed for and anticipate a single screen. When a presenter encounters a display server 102 that offers multiple screens, mechanism for exploiting those additional display resources without redesigning their presentation may be useful. One such mechanism is a scratch space. A scratch space is a special window that is intended to contain a copy of pixels taken from a source window. For example, as illustrated in FIG. 11, the source window 118 may be a window displayed in display 2 104-2 illustrated in FIG. 1. The scratch spaces 120-1, 120-2 and 120-3 (referred to herein generally as 102) (FIG. 11) may be available on displays 1 and 3 104-1 and 104-3 (FIG. 1) respectively. Embodiments may be implemented to quickly move pixels from display 2 104-2 to one or more scratch spaces that may be implemented on display 1 104-1 and/or display 3 104-3.

Some embodiments may be implemented where for a given source window 118 one or more scratch space windows 120 are created and positioned relative to the source window 118. Each scratch space window 120 has an associated accelerator key or key combination (i.e. up arrow, right arrow, control-C). When the presenter strikes one of the accelerator keys the pixels in the source window 118 are copied into the scratch space window 120 corresponding to that accelerator key or key combination. Various alternative embodiments may be implemented. For example, in one embodiment, the pixels may remain in the source window 118 while also being copied to and displayed in a scratch space window 120.

Some embodiments may be implemented where for a given source window 118 there may be two or more scratch space windows 120 that are arranged in a cascade. In a cascade, scratch spaces are ordered and windows are moved down in the ordering when a new window is added to the scratch space cascade. In a specific example, scratch spaces may be arranged in numeric order from 1 to N. Copying to any scratch space S such that S<N means that first the pixels in space S are copied to space S+1. Illustratively in a cascade, before copying pixels into window B the pixels of window B are copied into window C and before copying pixels into window A, the pixels of window A are copied into window B, and so forth. This creates a running history of the high points of the presentation with minimal effort on the part of the presenter.

Some embodiments may be implemented where for a given source window 118 there may be two or more scratch space windows 120 that are selected in rotation. Whenever pixels are copied from the source window 118, they are copied into the next window in the rotation, the selected window is then moved to the next window in the rotation.

Some embodiments may include automated movement of windows to scratch spaces. In some embodiments, this may be accomplished by embedding images into a window. In particular, it may be desirable to set up the use of scratch spaces in advance within the presentation so that the presenter can ignore them completely. An automatic mechanism may be implemented for triggering a scratch space copy directly from the images of the presentation to a scratch space.

Referring now to FIG. 11, an example is illustrated where a source window 118 is configured with one or more scratch space windows 120-1, 120-3 and 120-3. Each scratch space window 120 has an associated trigger image and/or an image position for that trigger. Illustratively scratch space window 120-1 is associated with a right pointing arrow; scratch space window 120-2 is associated with a down pointing arrow, and scratch space window 120-3 is associated with a star. The pixels of the source window 118 are searched for the image fragments associated with each scratch space. If the image fragment matches the pixels in the source window 118, then a copy from the source window 118 to the corresponding scratch space is initiated. There are a variety of match functions that can be used to compare the trigger image to pixels in the source image.

For example, in one embodiment, the trigger image is only compared to pixels at a fixed location in the source image. In an alternative embodiment, the trigger image is compared to pixels within some range of a fixed location in the source image. This reduces placement errors but may be more costly to compute. In an alternative embodiment, the trigger image is compared to all pixel locations in the source image. This allows the trigger to be placed anywhere in the source but may be much more costly to compute.

In one embodiment, transparent or partially transparent pixels in the trigger image are ignored during the match. This is robust relative to background material around the trigger.

In one embodiment, when comparing, corresponding pixels are compared and a distance is computed between each pair of pixels. This distance is summed across all pixels in the trigger image. The trigger occurs if the sum of the distances is less than a threshold.

Various alternative embodiments may be implemented. For example, in one embodiment, the pixels may remain in the source window 118 while also being copied to and displayed in a scratch space window 120. In alternative embodiments, a next slide or window or some other data may be displayed in the source window 118 when pixels are copied and displayed to a scratch space window 120.

Thus, as illustrated, embodiments may implement an automatic trigger of a scratch space copy when the pixels of the image fragment associated with a scratch space window 120 match pixels in a source window 118 according to some match function, such as one of the match functions discussed above.

Figure 12:
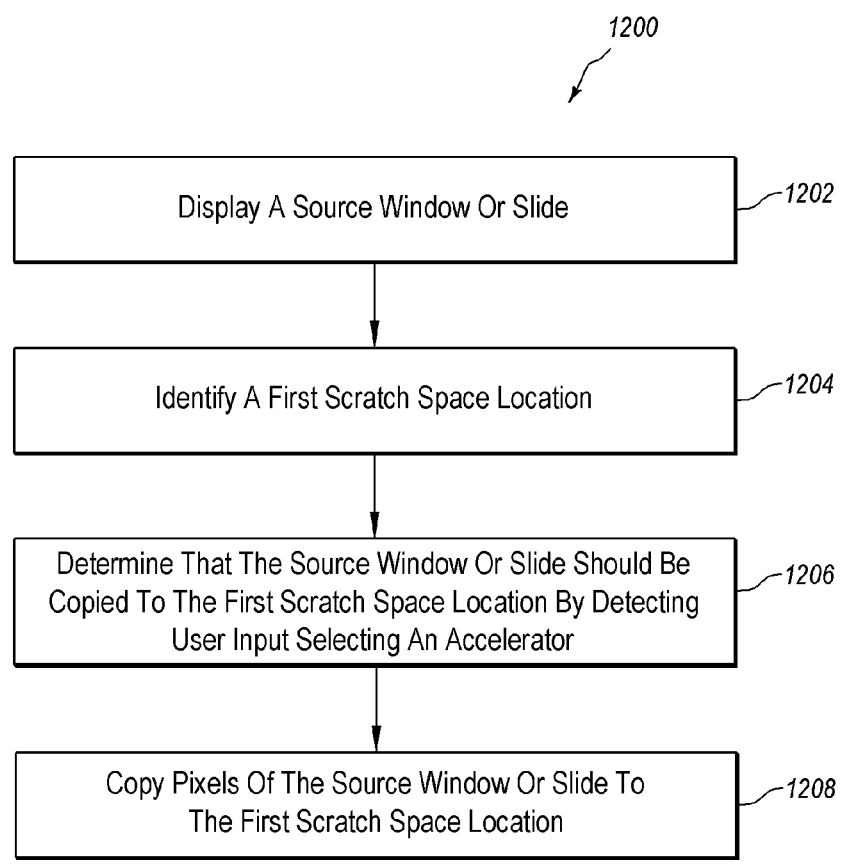
FIG. 12 illustrates a method of a method of implementing scratch spaces.

Referring now to FIG. 12, a method 1200 is illustrated. The method 1200 may be practiced in a computing environment including one or more client devices and a display server. The display server comprises a display with a plurality of screens. The method includes acts for implementing scratch spaces to display one or more windows or slides previously streamed while displaying a currently streamed window or slide.

The method 1200 includes using at least one of the plurality of screens, displaying a source window or slide (act 1202).

The method 1200 further includes identifying a first scratch space location (act 1204).

The method 1200 further includes determining that the source window or slide should be copied to the first scratch space location by detecting user input selecting an accelerator (act 1206).

The method 1200 further includes as a result of determining that the source window or slide should be copied to the first scratch space location, copying pixels of the source window or slide to the first scratch space location (act 1208).

Figure 13:
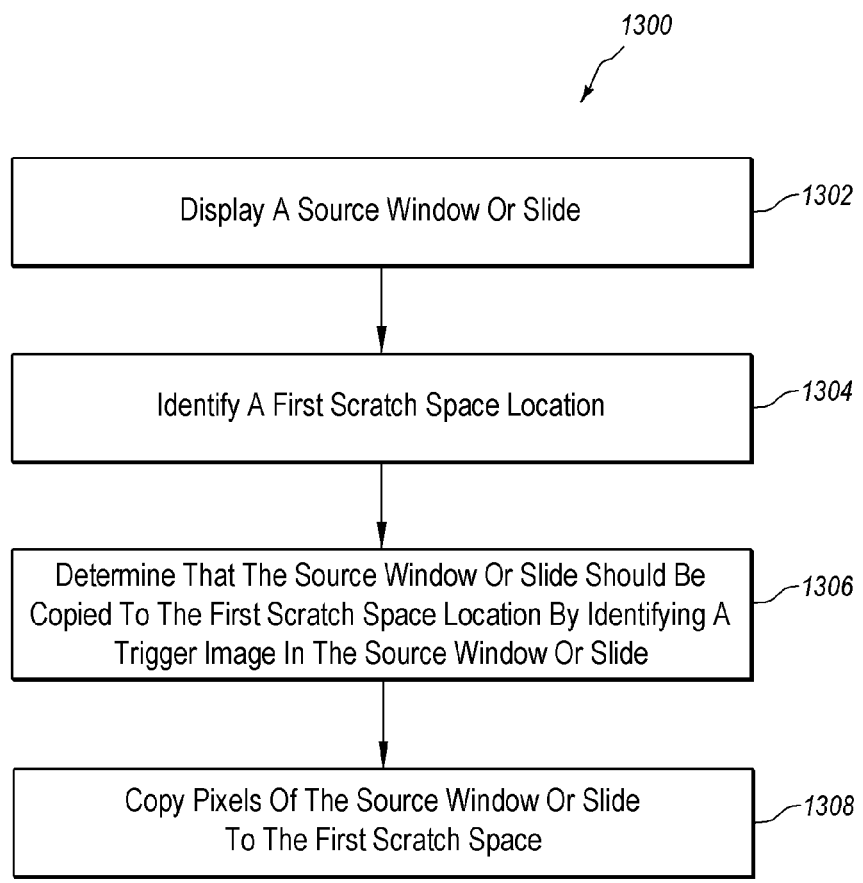
FIG. 13 illustrates an alternate method of implementing scratch spaces.

Referring now to FIG. 13, a method 1300 is illustrated. The method may be practiced in a computing environment which includes one or more client devices and a display server. The display server includes a display with a plurality of screens. The method 1300 includes acts for implementing scratch spaces to display one or more windows or slides previously streamed while displaying a currently streamed window or slide.

The method 1300 includes using at least one of the plurality of screens, displaying a source window or slide (act 1302).

The method 1300 further includes identifying a first scratch space location (act 1304);

The method 1300 further includes determining that the source window or slide should be copied to the first scratch space location by identifying a trigger image in the source window or slide (act 1306)

As a result of determining that the source window or slide should be copied to the first scratch space location, the method 1300 further includes copying pixels of the source window or slide to the first scratch space location (act 1308).

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of displaying windows from a client device, the method comprising:
   displaying a plurality of windows on one or more displays at a client device, wherein the windows are displayed with a first window overlapping a second window on a single display thus obscuring at least a portion of the second window, and wherein the first window overlapping the second window becomes a current window, the current window being the current window based at least on the front to back ordering of windows displayed at the client device;
   as a result of the first window being the current window, capturing and sending pixels in a region of the first window to a display server, wherein at the display server, the first window is displayed on a first display region;
   determining that the second window should be the current window based on a change in front to back ordering of windows displayed at the client device;
   causing the second window to become the current window;
   as a result of the second window being the current window, capturing and sending pixels in a region of the second window to the display server, wherein at the display server, the second window is displayed on a second display region, wherein, at the display server, the first and second windows are displayed in a non-overlapping fashion by displaying the first window and the second window on separate display regions while the windows continue to be displayed with overlap of the first window and the second window on the single display at the client device.

2. The method of claim 1, wherein pixels for the first window are sent to a first slave server and pixels for the second window are sent to a second slave server by the display server, and wherein the first slave server controls a first display and the second slave server controls a second display such that displaying the first window and the second window on separate displays comprises the first slave server displaying the first window on the display and the second slave server displaying the second window on the second display.

3. The method of claim 1, further comprising, when a non-distributed window overlaps a current window, at least one of preventing or obscuring information about the non-distributed window from being sent to the display server.

4. The method of claim 3, wherein the non-distributed window comprises a file dialog box.

5. The method of claim 3, wherein the non-distributed window comprises an alert message.

6. The method of claim 3, wherein preventing information about the non-distributed window from being sent to the display server comprises blocking transmission of pixels of the current window.

7. The method of claim 3, wherein preventing information about the non-distributed window from being sent to the display server comprises blocking transmission of pixels of the current window that are overlapped by the non-distributed window.

8. The method of claim 3, wherein preventing information about the non-distributed window from being sent to the display server comprises blocking transmission of pixels of the non-distributed window from being transmitted to the display server.

9. The method of claim 3, further comprising:
   accessing pixels of the portion of the current window where the non-distributed window overlaps the current window and wherein the accessed pixels were captured before the non-distributed window overlapped the current window;
   blending the accessed pixels with a highlight color to create modified pixels;
   distributing the modified pixels to the display server, where they are subsequently displayed, to show that those pixels are not currently being updated, whereafter the pixels of the non-distributed window overlapping the current window are blocked from being sent to the display.

10. The method of claim 9, wherein the highlight color is gray.

11. In a computing environment, a method of displaying windows from a client device, the method comprising:
displaying a plurality of windows on one or more displays at a client device, wherein the windows are displayed on a single display by displaying a first window and a second window, the second window being overlapped by another window thus obscuring at least a portion of the second window;
capturing and sending pixels in a region of the first window to a display server, wherein at the display server, the first window is displayed on a first display region;
updating information that could be displayed in the second window at the client device in an area of the second window that is obscured by the other window, while obscured by the other window;
graphically rendering the information that could be displayed in the second window at the client device in an area of the second window that is obscured by the other window to an off-screen image memory;
capturing and sending pixels in the off-screen image memory to the display server, wherein at the display server, the second window is displayed on a second display region, wherein, at the display server, the first and second windows are displayed in a non-overlapping fashion by displaying the first window and the second window on separate display regions, with the second window not being overlapped by the another window in the second display region but still displaying at the second display region pixels for the second window that are overlapped by another window at the client device, while the first window and second window continue to be displayed where the second window is overlapped by another window thus obscuring at least a portion of the second window at the client device.

12. The method of claim 11, wherein pixels for different windows displayed at the display server are sent to different slave servers by the display server, and wherein each slave server controls a different display such that displaying the first window and the second window on separate displays comprises each slave server displaying a different window at a different display.

13. The method of claim 11, wherein the other window is a non-distributed window not intended to be shared with the display server, the method further comprising, preventing or obscuring information about the non-distributed window from being sent to the display server.

14. The method of claim 13, wherein the non-distributed window comprises a file dialog box.

15. The method of claim 13, wherein the non-distributed window comprises an alert message.

16. The method of claim 11, wherein the other window is the first window.

17. In a computing environment, a method of displaying windows from a client device, the method comprising:
at a display server receiving pixels for a first window from a client device, wherein at the client device, a plurality of windows are displayed on one or more displays at a client device, wherein the windows are displayed with the first window overlapping a second window on a single display thus obscuring at least a portion of the second window;
at the display server, displaying the first window on a first display region;
at a display server receiving pixels for the second window from the client device;
at the display server displaying the second window on a second display region, wherein, at the display server, the first and second windows are displayed in a non-overlapping fashion by displaying the first window and the second window on separate display regions while the windows continue to be displayed with overlap of the first window and the second window on the display at the client device.

18. The method of claim 12, wherein the pixels for the second window are received from an off-screen image memory at the client device.

19. The method of claim 12, wherein the pixels for the second window are received as a result of a change in front to back ordering of windows displayed at the client device.

* * * * *